(12) United States Patent
Fitz

(10) Patent No.: US 8,272,982 B2
(45) Date of Patent: Sep. 25, 2012

(54) CAM DAMPED PULLEY FOR ROTARY DEVICES

(75) Inventor: Frank A. Fitz, Poway, CA (US)

(73) Assignee: CT Drives, LLC, Los Gatos, CA (US)

( * ) Notice: Subject to any disclaimer, the term of this patent is extended or adjusted under 35 U.S.C. 154(b) by 1033 days.

(21) Appl. No.: 12/170,357

(22) Filed: Jul. 9, 2008

(65) Prior Publication Data

US 2010/0009796 A1    Jan. 14, 2010

(51) Int. Cl.
| F16D 3/00 | (2006.01) |
| F16D 7/04 | (2006.01) |
| F16H 55/14 | (2006.01) |
| F16H 55/36 | (2006.01) |
| F16H 9/00 | (2006.01) |
| F16H 59/00 | (2006.01) |
| F16H 61/00 | (2006.01) |
| F16H 63/00 | (2006.01) |

(52) U.S. Cl. ............... 474/94; 474/70; 464/37; 464/39
(58) Field of Classification Search ............ 474/70, 474/94, 109, 135; 464/30, 36, 39, 37
See application file for complete search history.

(56) References Cited

U.S. PATENT DOCUMENTS

| 2,128,425 | A | * | 8/1938 | Martelli | 474/70 |
| 2,398,261 | A | * | 4/1946 | Stone | 192/45 |
| 2,564,605 | A | * | 8/1951 | Martin | 464/43 |
| 2,642,730 | A | * | 6/1953 | Snyder | 464/32 |
| 3,017,977 | A | * | 1/1962 | Settimi et al. | 192/48.8 |
| 4,204,589 | A | * | 5/1980 | Loker et al. | 192/27 |
| 4,270,906 | A | * | 6/1981 | Kraft et al. | 474/135 |
| 4,464,147 | A | * | 8/1984 | Foster | 474/135 |
| 4,522,086 | A | * | 6/1985 | Haley | 477/39 |
| 4,768,634 | A | * | 9/1988 | Quick et al. | 192/56.56 |
| 4,871,296 | A | * | 10/1989 | Laessle et al. | 415/123 |
| 5,139,463 | A | * | 8/1992 | Bytzek et al. | 474/69 |
| 5,156,573 | A | * | 10/1992 | Bytzek et al. | 474/74 |
| 6,044,943 | A | * | 4/2000 | Bytzek et al. | 192/41 R |
| 6,059,085 | A | * | 5/2000 | Farnsworth | 192/55.1 |
| 6,083,130 | A | * | 7/2000 | Mevissen et al. | 474/70 |

(Continued)

FOREIGN PATENT DOCUMENTS

WO    WO 98/50709    11/1998

(Continued)

*Primary Examiner* — Michael Mansen
*Assistant Examiner* — Henry Liu
(74) *Attorney, Agent, or Firm* — Barry N. Young

(57) ABSTRACT

A drive system for a rotary device, such as an automotive alternator compensates for and dampens the effect of sudden bidirectional rotational velocity variations of the pulley caused by sudden acceleration and deceleration of an internal combustion engine without using a one-way clutch. The drive system in one aspect comprises an axially movable cam member rotatably supported on a hub that is connected to the alternator shaft and that is journaled within the pulley. The cam member is coupled to the pulley by splines so that it rotates with the pulley while affording axial movement. Springs urge the cam member into engagement with a cam follower on the hub. Upon sudden acceleration or deceleration of the pulley, the cam member rotates angularly relative to the cam follower and moves axially to compress the springs, which exert a restoring force on the cam member and cam follower to eliminate their relative angular rotation. In other aspects, projections on the pulley and the hub operate on springs or fluid filled chambers to dampen sudden velocity changes.

9 Claims, 8 Drawing Sheets

U.S. PATENT DOCUMENTS

| | | | |
|---|---|---|---|
| 6,116,393 A * | 9/2000 | Ooitsu et al. | 192/45 |
| 6,129,189 A * | 10/2000 | Kerr | 192/45 |
| 6,336,883 B1 * | 1/2002 | Bevc et al. | 474/166 |
| 6,446,776 B1 * | 9/2002 | Kerr | 192/44 |
| 6,531,849 B2 * | 3/2003 | Nakamura et al. | 322/27 |
| 7,004,865 B2 * | 2/2006 | Berndt et al. | 474/135 |
| 7,048,661 B2 * | 5/2006 | Shibata et al. | 474/94 |
| 7,070,033 B2 * | 7/2006 | Jansen et al. | 192/41 S |
| 7,153,227 B2 * | 12/2006 | Dell et al. | 474/70 |
| 7,207,910 B2 * | 4/2007 | Dell et al. | 474/74 |
| 7,384,355 B2 * | 6/2008 | Ayukawa et al. | 474/135 |
| 7,399,245 B2 * | 7/2008 | Spintzyk | 474/94 |
| 7,591,356 B2 * | 9/2009 | Guyader | 192/55.1 |
| 7,891,475 B2 * | 2/2011 | Zhu et al. | 192/54.5 |
| 2006/0191519 A1 * | 8/2006 | Bartell et al. | 124/1 |
| 2006/0219510 A1 * | 10/2006 | Chung et al. | 192/45 |
| 2007/0060395 A1 | 3/2007 | Asbeck et al. | |
| 2007/0060396 A1 * | 3/2007 | Bachle et al. | 464/89 |
| 2008/0096703 A1 * | 4/2008 | Labbe | 474/8 |
| 2008/0207364 A1 * | 8/2008 | Schebitz et al. | 474/94 |
| 2009/0107791 A1 * | 4/2009 | Zhu et al. | 192/70.14 |

FOREIGN PATENT DOCUMENTS

| | | |
|---|---|---|
| WO | WO 2004/011818 A1 | 2/2004 |
| WO | WO 2007/121582 A1 | 11/2007 |

\* cited by examiner

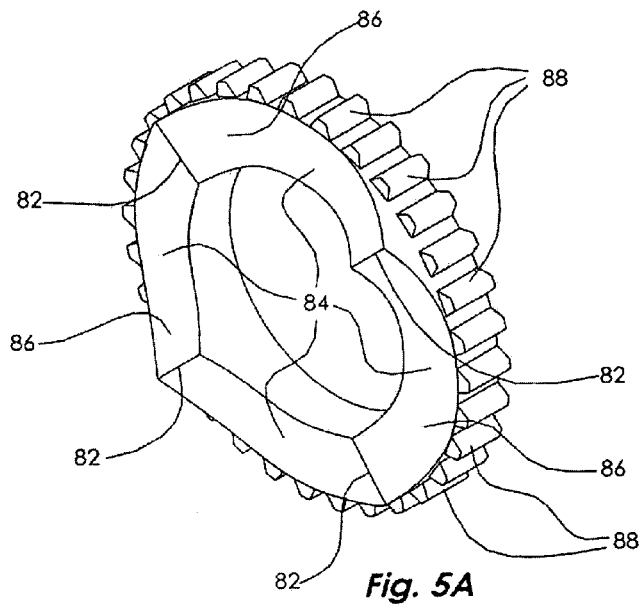
*Fig. 5A*
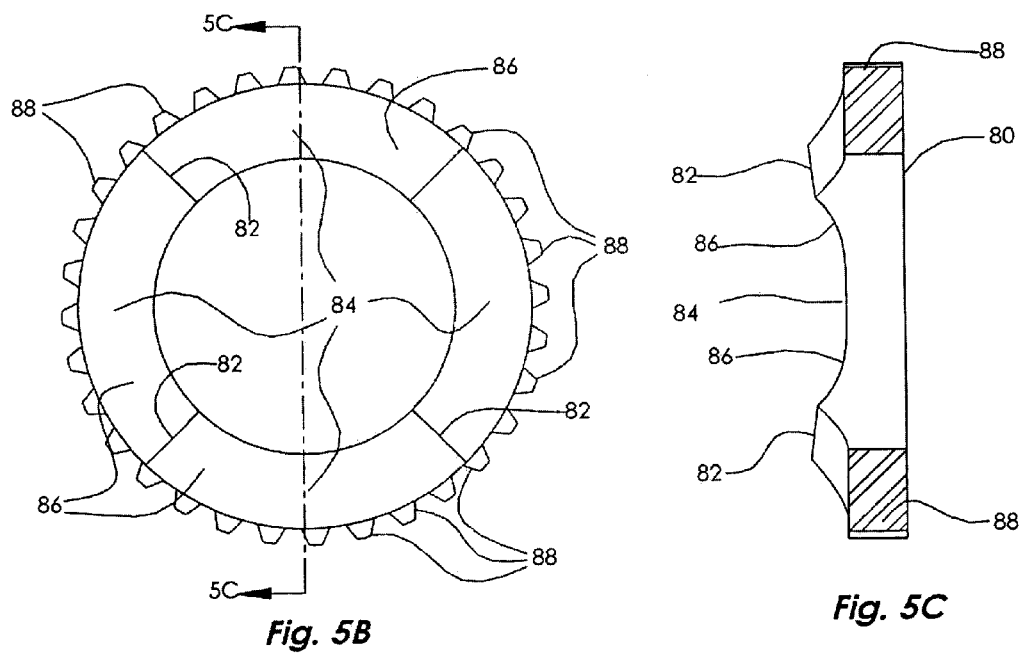
*Fig. 5B*
*Fig. 5C*

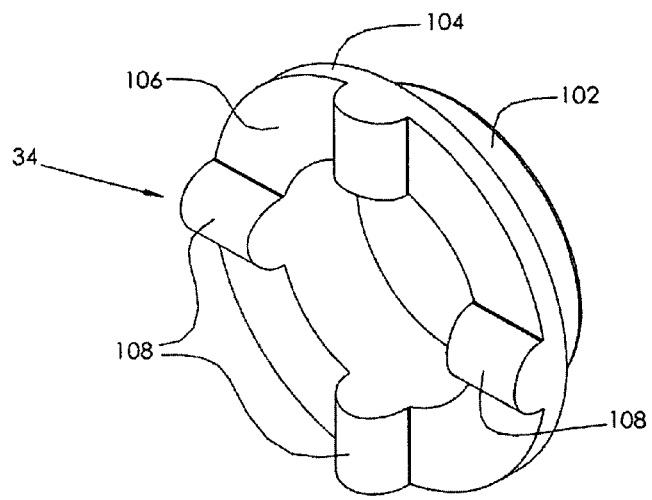
*Fig. 6A*
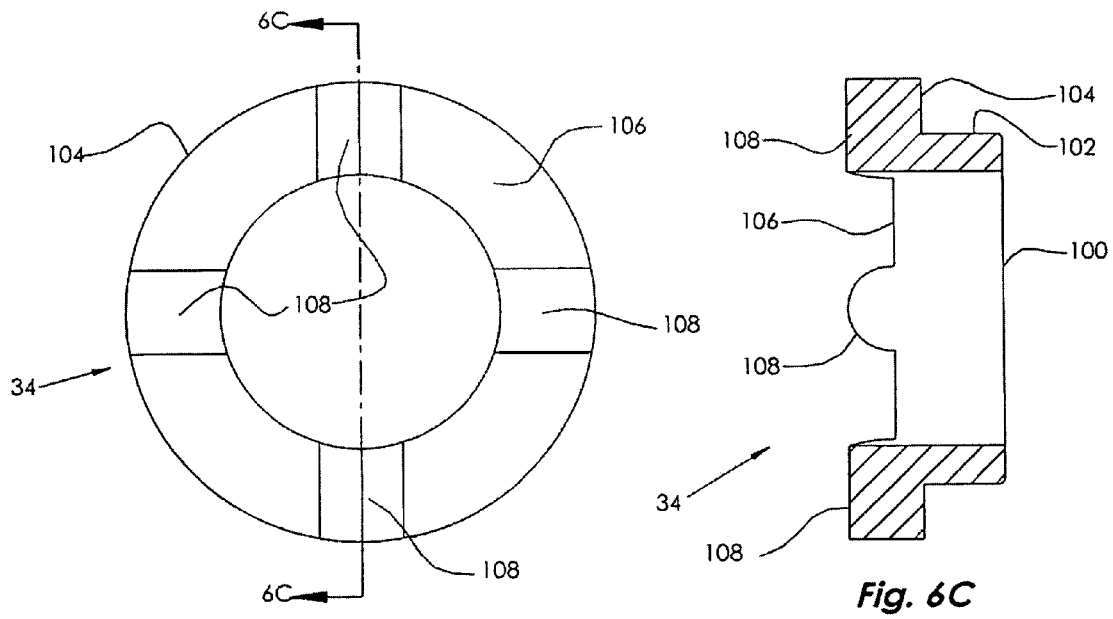
*Fig. 6B*
*Fig. 6C*

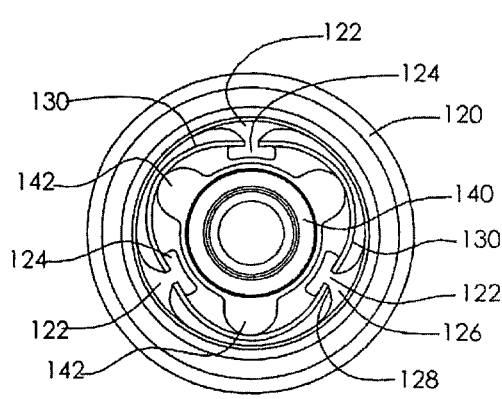
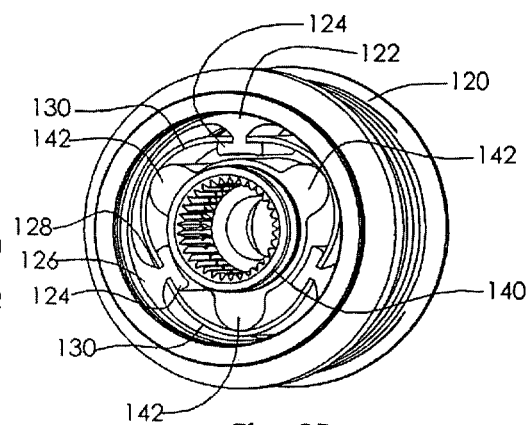
*Fig. 8A*  *Fig. 8B*
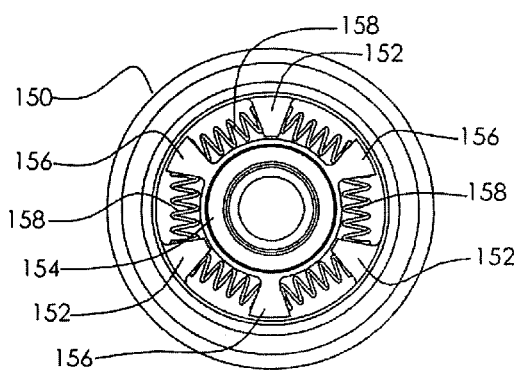
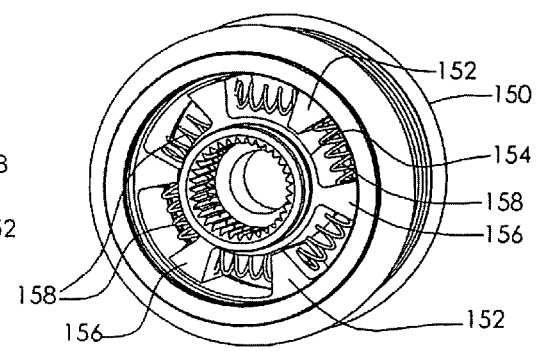
*Fig. 9A*  *Fig. 9B*
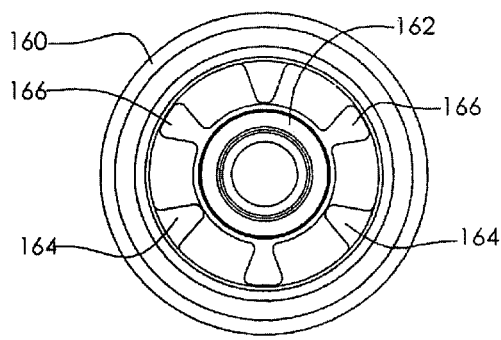
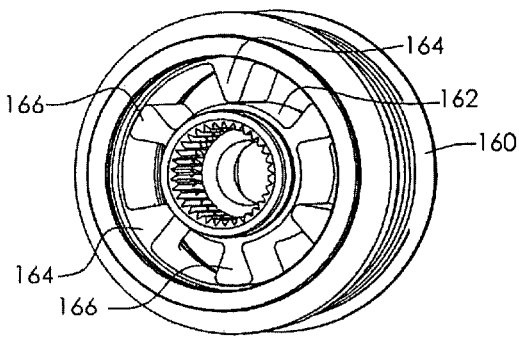
*Fig. 10A*  *Fig 10B*

CAM DAMPED PULLEY FOR ROTARY DEVICES

BACKGROUND

This invention relates generally to drive systems for rotary devices, and more particularly to drive systems for rotary automotive accessory devices such as alternators.

Some systems which employ rotary prime movers or drivers for providing rotational motive power for driving rotary accessory devices are characterized by dynamic loading and inertial torque characteristics which result in rotational perturbations that are transmitted to the accessory devices. An example of such systems is an internal combustion engine that drives rotary automotive accessory devices such as an alternator, air-conditioning compressor, water pump, etc., in vehicles. Rotation of the engine crankshaft is transmitted via a serpentine poly-V belt system to pulleys attached to the drive shafts of such accessory devices to rotate their shafts. The rotation of an internal combustion engine crankshaft is, however, subject to perturbations, the magnitude and frequency of which varies with engine RPM. During combustion, the crankshaft temporarily speeds up and generates a pulse of rotational power that is transmitted via the belt to the rotary accessories. During compression, the crankshaft temporarily slows down. Thus, the crankshaft continually exhibits acceleration and deceleration and effectively imparts a pulsed driving characteristic to the serpentine belt system, which in turn is transmitted to the accessory devices. Generally, the slower the rotational speed of the crankshaft or the fewer the number of cylinders, the greater the pulse effect. At engine idle, for instance, the magnitude of the variations is the greatest and the effects most noticeable.

Crankshaft pulsations are transmitted to the serpentine belt system and the driving pulleys of accessory devices as dynamic rotational velocity fluctuations. However, the inertias of the rotary devices tend to resist the velocity fluctuations. This generates dynamic tensions in the belt as it tries to accelerate and decelerate the rotary devices to accommodate the fluctuations. These fluctuations are transmitted to the shafts of the rotary devices through their pulleys. Conventional belt tensioners cannot totally compensate for these dynamic fluctuations that may produce undesirable belt slippage, noise and vibration that are transmitted to the passenger compartment, as well as cause wear and tear on the rotary devices. This results in higher than desirable belt wear and shortens the life of the rotary devices. Automotive alternators are particularly susceptible to increased wear and decreased life due to such fluctuations because of their high inertia and high speed, and they tend to fail frequently.

One approach which has been proposed to address the problem of dynamic fluctuations and reduced life of rotary devices, such as automotive alternators, has been to employ one-way clutches in the pulleys of the rotary devices. Conventional one-way clutches are mechanical devices that engage when the alternator pulley rotates in the driving direction but disengage when the pulley rotates in the opposite direction relative to the shaft. One-way clutches accommodate crankshaft slowdown reasonably well since they overrun and disengage the pulley from the shaft and permit the shaft to continue rotating under the inertia of the alternator shaft and armature. However, one-way clutches do not accommodate well abrupt increases in speed, as when combustion occurs, since they engage suddenly and try to accelerate the shaft rotation rapidly to match the increased belt velocity. Repeated sudden engagement of the one-way clutch with the pulley results in high wear and frequent failure of the one-way clutch, and may shorten the life of the alternator bearings. Thus, one-way clutches used in high frequency loading environments have high failure rates. Moreover, one-way clutches do not eliminate the problems of rotational velocity fluctuation, noise and vibration since they address only belt deceleration but not belt acceleration.

Accordingly, another approach that has been proposed is to implement an isolator for an alternator pulley with a one-way clutch implemented using coil springs that permit some relative resilient rotational movements in opposite directions with respect to the alternator pulley. When the pulley accelerates, a coil spring about the shaft tightens and engages the shaft rapidly, typically in about a degree or so of angular rotation, to impart rotation to the shaft and another coil spring engages the shaft to permit some resilient relative rotation. In the opposite over-running direction, the pulley is free to decelerate relative to the alternator shaft.

There is a need for an improved drive system for coupling a rotating prime mover to the shaft of a rotating device that compensates for sudden relative rotational angular velocity differences between the prime mover driver and a driven device due to sudden acceleration and deceleration of the prime mover, by dampening and cushioning bidirectional relative rotations between the driver and the device. More particularly, it is desirable to provide an improved driving system for a rotary device in a dynamically changing environment that is simpler, more reliable, has a longer lifetime, and that affords better compensation of noise and vibrations than known drive systems. It is to these ends that the present invention is directed.

SUMMARY OF THE INVENTION

The invention affords drive systems for rotary devices that address the foregoing and other problems of conventional drive systems that attempt to compensate for sudden rotational velocity changes. Drive systems in accordance with the invention compensate for and dampen accelerations and decelerations to substantially reduce or avoid the impact of abrupt velocity changes on the shaft of a rotary device. Drive systems in accordance with the invention operate bidirectionally, and afford equal damping in opposite rotational directions so that they accommodate both accelerations and decelerations. Moreover, the drive systems of the invention accomplishes this while maintaining direct engagement between a rotating pulley driven by a prime mover and the drive shaft of the rotary device driven by the pulley, thereby affording positive control over the rotating shaft.

In accordance with one aspect, the invention provides a drive system for a rotary device having a shaft that is rotated by a pulley driven by a prime mover. A hub connected to the shaft and journaled within the pulley slideably supports a movable member thereon for axial movement along the hub, while the movable member remains coupled to the pulley for rotation with the pulley. A cooperating member on the hub engages the movable member to transmit rotation of the pulley to the shaft. A resilient mechanism urges the movable member into continuous engagement with the cooperating member. The movable member and the cooperating member are formed for relative bidirectional rotation over a predetermined range of angular rotations such that sudden bidirectional rotational velocity changes of the pulley produce corresponding relative angular rotation of the movable and cooperating members to dampen the impact of the velocity changes on the shaft.

In another aspect, the invention affords a drive system for rotary devices comprising a pulley for driving the shaft of the rotary device and a hub journaled within the pulley connected to the shaft. The pulley is formed with a plurality of first projections extending radially toward the hub, and the hub has a plurality of second projections extending radially toward the pulley. A plurality of spring members connected to the projections are arranged to be deformed by the projections upon relative angular rotation of the pulley and the hub upon the pulley being subjected to sudden rotational velocity changes. The drive system operates bidirectionally for both accelerations and decelerations of the pulley. Deformation of the spring members dampens the impact of a velocity changes on the shaft by affording resilient bidirectional relative angular rotation between the pulley and the hub which is connected to the shaft. Upon being deformed, the spring members exert a restoring force on the projections in a direction to eliminate the relative angular rotation.

In yet another aspect, the invention affords a drive system for a rotary device that comprises a pulley and a hub connected to a shaft of the pulley that is journaled within the pulley, where the pulley has a plurality of first projections extending radially inwardly substantially to the hub, and the hub has a plurality of second projections extending radially substantially to the pulley, the second projections being disposed in a space between adjacent first projections. A non-compressible fluid fills the spaces between projections. Relative angular rotation of the pulley and the hub decreases the volume of the spaces in the direction of relative rotation of the pulley to force the fluid through limited clearances between the projections and the adjacent surfaces of the pulley and the hub to absorb the impact on the shaft caused by sudden rotational velocity changes of the pulley. The fluid within the spaces having their volume reduced exerts restoring forces on the projections to eliminate the relative angular rotation.

In still a further aspect, the invention affords a method of driving a rotary device by a pulley in which the pulley is coupled to the shaft by a springy connection that affords relative bidirectional angular rotation of the shaft and pulley over a predetermined range, and in which rotation of the pulley is transmitted to the shaft. Upon sudden acceleration and deceleration of the pulley, the pulley is rotated angularly relative to the shaft to dampen the effects of sudden rotational velocity changes of the pulley on the shaft

BRIEF DESCRIPTION OF THE DRAWINGS

FIG. 5A is a perspective view of an embodiment of a cam member of the drive system of the first embodiment of the invention;

FIG. 5B is a plan view of the cam member of FIG. 5A;

FIG. 5C is a cross sectional view of the cam member taken along the lines 5C-5C of FIG. 5B;

FIG. 6A is a perspective view of an embodiment of a cam follower of the drive system of the first embodiment of the invention;

FIG. 6B is a plan view of the cam follower of FIG. 6A;

FIG. 6C is a cross sectional view of the cam follower taken along the lines 6C-6C of FIG. 6B;

FIGS. 8A-B are, respectively, an end view and a perspective view of a second embodiment of a drive system in accordance with the invention;

FIGS. 9A-B are, respectively, an end view and a perspective view of a third embodiment of a drive system in accordance with the invention; and FIGS. 10A-B are, respectively, an end view and a perspective view of a fourth embodiment of a drive system in accordance with the invention.

DESCRIPTION OF PREFERRED EMBODIMENTS

The invention is particularly well adapted for use with automotive alternators and will be described in that context. It will be appreciated, however, that this is illustrative of only one utility of the invention, and that the invention has broader applicability to other applications and to other types of rotating devices. As will be appreciated from the description which follows, the invention has utility, for example, in many other types of applications and systems which employ internal combustion engines or other rotating prime movers that are characterized by pulsed rotational variations or perturbations.

Figures 1, 3:
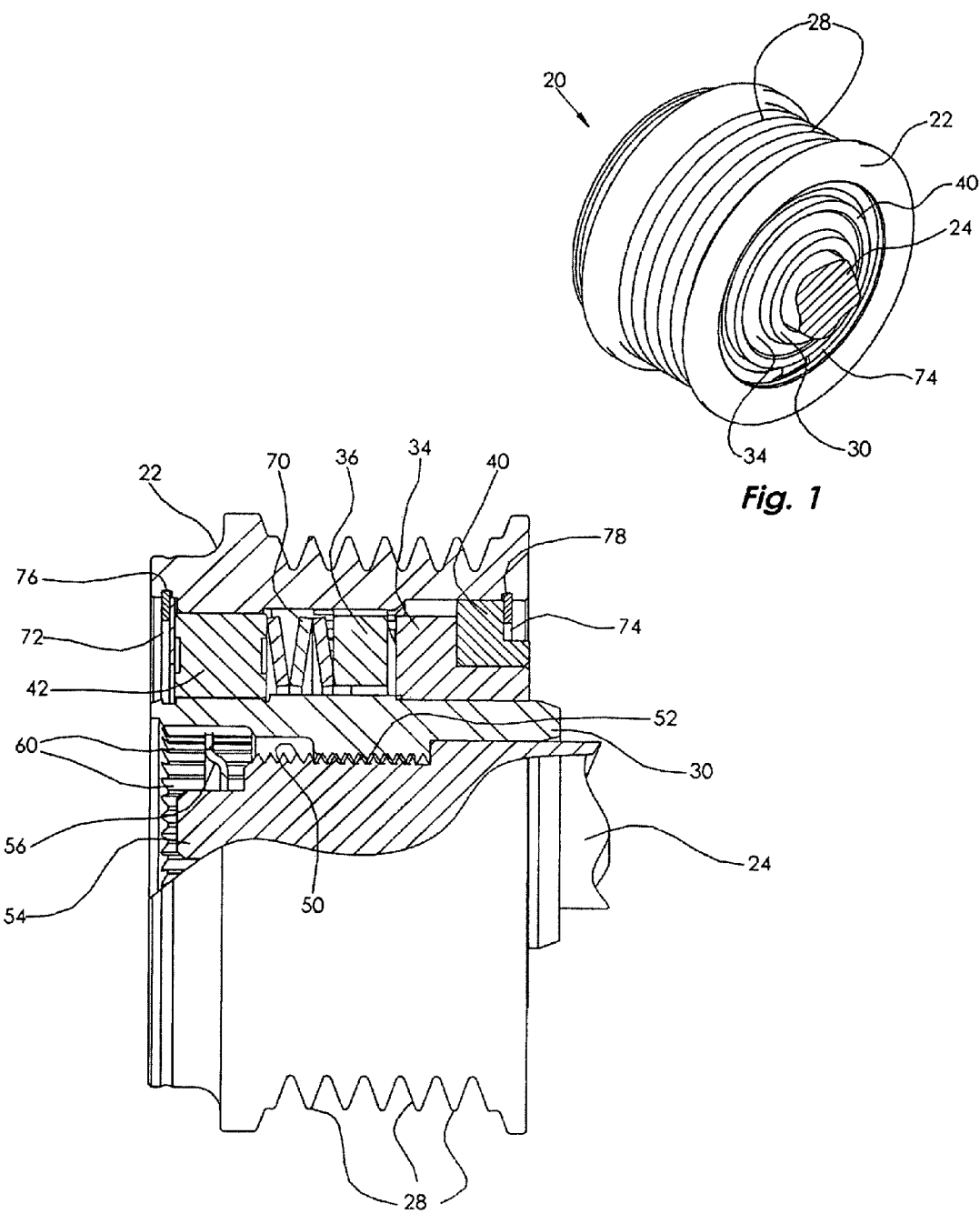
FIG. 1 is a perspective view of a pulley assembly for a rotary device incorporating a first embodiment of a drive system in accordance with the invention.
FIG. 3 is a side view partially in section of the pulley assembly of FIG. 1.

FIG. 1 shows a perspective view of a pulley assembly 20 comprising a pulley 22 and a drive system in accordance with the invention. The pulley assembly is adapted to be located on the end of a drive shaft 24 of a rotating device, such as an automotive alternator (not illustrated), and to be driven in a well known manner by a serpentine drive belt (not illustrated) of an internal combustion engine to rotate the alternator shaft.

As will be described in more detail below, the invention affords relative bidirectional rotational movement or slippage between the pulley 22 and the alternator shaft 24 to compensate for rotational perturbations. With internal combustion engines, the rotational perturbations are most pronounced at low RPMs, as at engine idle. At higher RPMs, the rotational velocity changes are smaller, and at normal operating speeds, e.g. above about 1200 RPMs, they may be substantially unnoticeable. In steady-state conditions when the crankshaft of the internal combustion engine that drives the serpentine belt is rotating at a substantially constant speed, the pulley and the alternator shaft will be rotating at substantially the same speed. When the crankshaft suddenly accelerates, as during a combustion stroke, there is a substantially instantaneous (typically within a fraction of a second) increase in its rotational velocity which is transmitted to the pulley through the belt. The invention permits the pulley to accelerate suddenly and rotate relative to the alternator shaft, i.e., slip, by a predetermined angular rotation, as will be described. Thus, the sudden acceleration of the pulley is not transmitted immediately to the shaft. The inertia of the alternator shaft and armature tend to resist abrupt rotational speed changes, and the coupling between the pulley and the shaft permits relative angular rotation or slippage between the pulley and shaft as the pulley suddenly accelerates. As the rotational angular deviation between the pulley and the shaft increases, the coupling between the pulley and the shaft, which varies with angular deviation, also increases producing a more gradual increasing engagement between the pulley and shaft and increasing acceleration of the shaft to match the rotational velocity of the pulley. Thus, sudden impulses to the pulley are dampened and cushioned so that abrupt speed changes are transmitted more gradually to the shaft over a range of angular rotations typically measured in tens of degrees, thereby reducing or substantially eliminating abrupt longitudinal force variations in the belt and corresponding vibration and noise.

When the rotational velocity of the pulley decreases, as during compression, the inertia of the alternator shaft and armature tend to maintain their rotational velocity constant as the pulley rotational velocity decreases. The coupling between the pulley and the shaft permits relative rotation or slippage in the opposite direction so that the abrupt deceleration of the pulley is not transmitted immediately to the shaft. The coupling varies with the relative angular rotational difference between the pulley and shaft. As with pulley acceleration, as the angular deviation between the shaft and the pulley increases, the coupling and engagement between them also increases causing the rotational velocity of the shaft to decrease to match that of the pulley. Similar to the description above for accelerations, rotational velocity changes due to abrupt deceleration of the pulley are dampened and cushioned by the invention and not imparted to the shaft. The drive system of the invention that affords this bidirectional cushioning to dampen the effects of differential rotational velocity changes will be described in more detail below.

Figure 2:
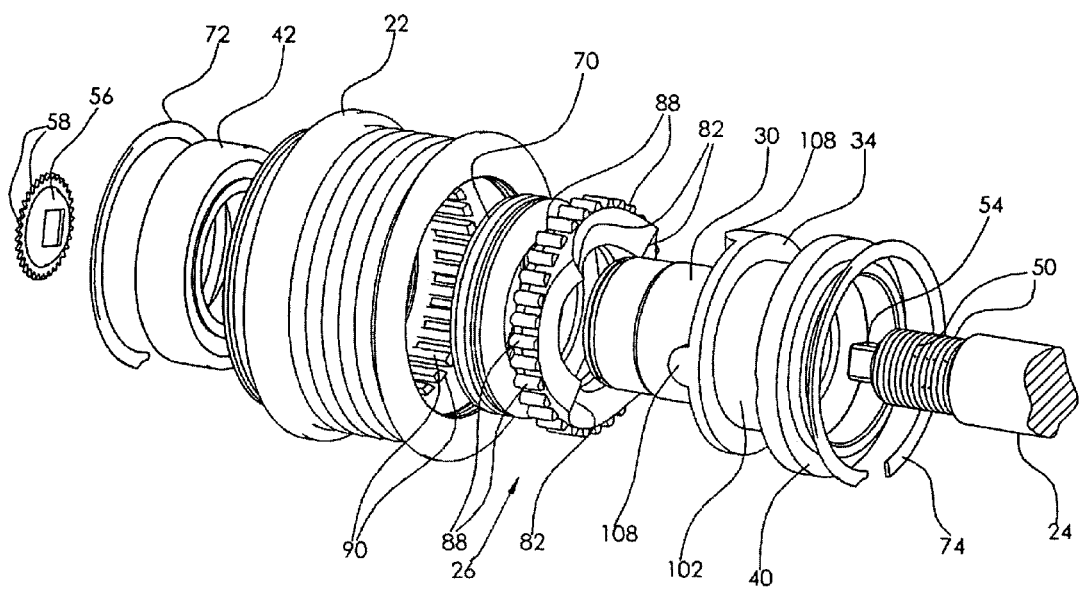
FIG. 2 is an exploded perspective view of the pulley assembly of FIG. 1 that illustrates the components of the first embodiment of the drive system of the invention.
Figure 4A:
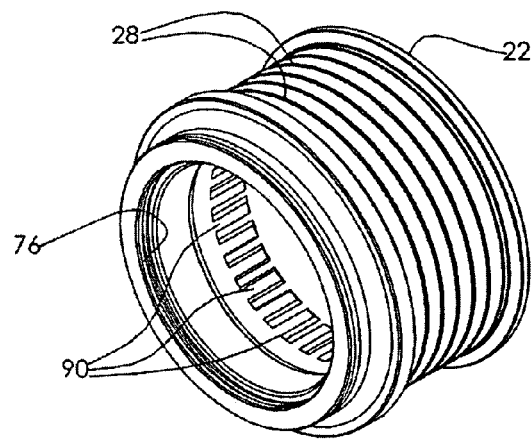
FIG. 4A is a perspective view of a pulley body of the pulley assembly of FIG. 1.
Figure 4B:
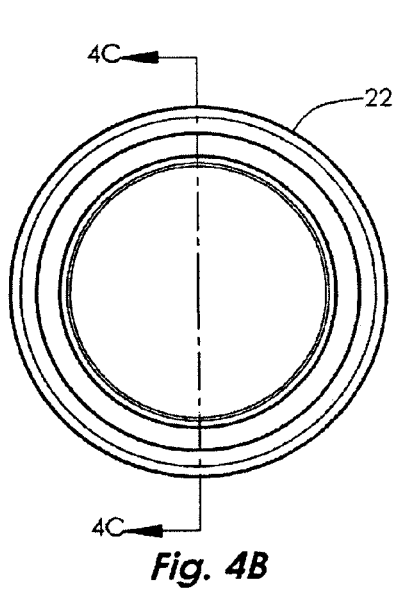
FIG. 4B is an end view of the pulley body of FIG. 4A.
Figure 4C:
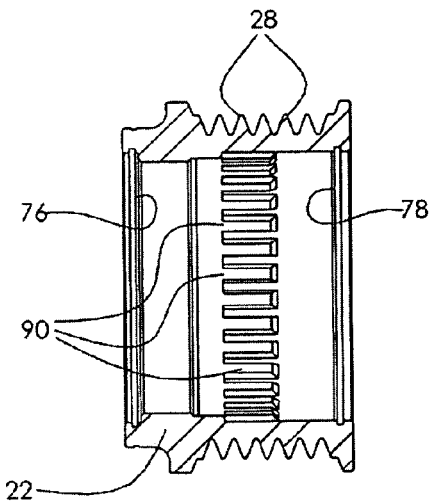
FIG. 4C is a cross sectional view taken along the lines 4C-4C of FIG. 4B.

FIGS. 2 and 3 are, respectively, an exploded perspective view and a partial cross-sectional view of the pulley assembly 20 embodying the drive system 26 in accordance with a preferred embodiment the invention. As shown, the pulley 22 may comprise a cylindrical tubular barrel having a plurality of circumferential ribs and grooves 28 formed about its exterior surface that are adapted to mate with corresponding ribs and grooves of a serpentine belt (not shown) to rotate the pulley. Disposed within the interior cavity of the pulley on shaft 24 is a hub or shaft 30 having fixed thereon a cam follower 34 that cooperates with a cam member 36 that is slideably disposed on shaft 30 for axial and rotational movement on the shaft. Hub 30 may be journaled within pulley 22 by a bushing 40 at the rear or right end (in the figures) of the pulley assembly adjacent to the alternator housing (not shown) and by a bearing 42, such as a bushing, ball bearing, or roller bearing, for example, disposed at the forward or left end of the shaft.

As shown in the figures, the forward end of shaft 24 may be threaded at 50 to mate with corresponding internal threads 52 within the interior of hub 30 to connect the hub to shaft 24, as shown in FIG. 3. The forward end 54 of shaft 24 may be squared to mate with a corresponding square opening in a shaft lock 56 disposed at the forward end of shaft 24. Shaft lock 56 may comprise a disk having circumferential threads or points 58 that mate with corresponding splines 60 within the forward interior end 62 of hub shaft 30 (see FIG. 3). The shaft lock serves to hold the hub 30 fixed in place on the alternator shaft 24. The square end 54 of the shaft 24 may be adapted to mate with a wrench or socket to facilitate assembly of the drive system on the end of the shaft.

The invention employs a resilient biasing mechanism for urging the cam member and cam follower into continuous engagement. The biasing mechanism preferably comprises annular springs 70, such as a plurality of Belleville washers or a coil spring, for example, disposed on hub 30 between the cam member 36 and the bearing 42, as best illustrated in FIG. 3. The springs 70 act against bearing 42 and the backside 80 of slideable cam member 36 to exert an axial force on the cam member to urge it into engagement with the cam follower 34. A pair of C-shaped retaining rings 72 and 74, formed of spring steel, for example, are located at the forward and rear ends, respectively, of shaft 24 and snap fitted into corresponding interior circumferential forward and rear grooves 76, 78, respectively, of the pulley 22. The retaining rings retain the components of the drive system appropriately located within the interior cavity of the pulley, and maintain the pulley and drive system connected. As best illustrated in FIG. 3, retaining ring 72 engages bearing 42, while retaining ring 74 engages bushing 40. The axial force exerted by the springs 70 on cam member 36 and through the cam member on the cam follower 34, also maintains the bushing 40 in engagement with retaining ring 74 to axially locate the pulley and the drive system on the hub 30. The springs afford a springy connection between the pulley and the shaft that afford resilient relative bidirectional angular rotation of the shaft and pulley over a predetermined range of angular rotation, as will be described.

As shown in FIGS. 5A-C, cam member 36 may comprise an annular member having a planar forward surface 80, and an opposite rear surface 86 formed with one or more cam lobes 82 comprising raised areas on the rear surface of the annular member that are connected by smoothly curved contoured surface areas 84 to form high points and low points or valleys in the surface. In the preferred embodiment of the cam member illustrated in the figures, the cam member has four cam lobes 82, each comprising a peak in its rear surface 86 extending radially across the width of the surface and connected by a smooth arcuate contoured surface area between adjacent cam lobes. In the preferred embodiment illustrated in the figures, the four cam lobes are spaced symmetrically at equal angles of 90° around the circumference of the rear surface of the cam member. Other embodiments may have more or fewer cam lobes, for example, between one and eight cam lobes.

As will be described below, the cam lobes cooperate with cam follower elements on the cam follower 34 to afford relative angular rotation and axial displacement between the cam member and cam follower. If the cam member has more than one cam lobe, the cam lobes are preferably spaced symmetrically at equal angles around the circumferential surface 86 so that they act together with the cam follower to distribute the axial forces between the cam member and cam follower equally across these elements. The number of cam lobes determines the range of relative angular displacement between the cam member and the cam follower during velocity perturbations, and, in turn, the range of relative angular displacement between the pulley and the alternator shaft. The axial distance between the peak 82 of the cam lobes and the low points or valleys 84 in the surface 86 will determine the maximum axial translation of the cam member on hub 30 relative to the cam follower.

Figure 5D:
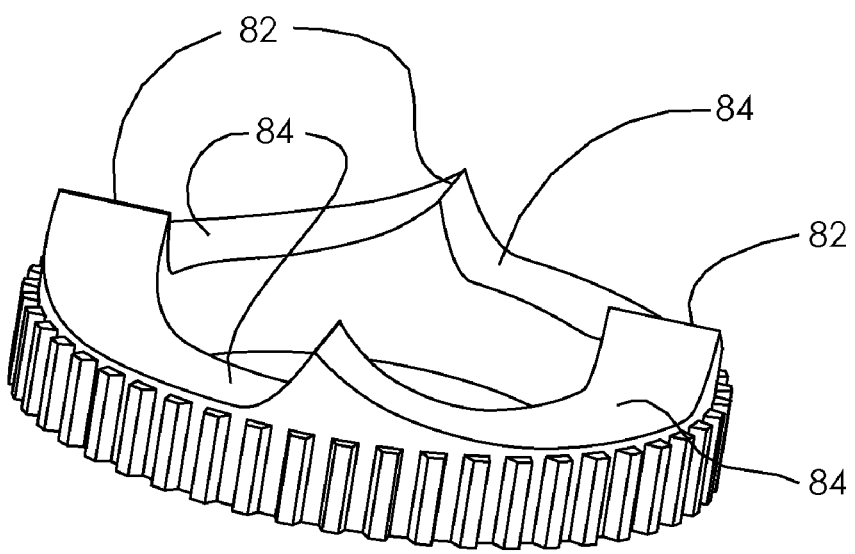
FIG. 5D is a perspective view of an embodiment of an asymmetrical cam member of the drive system in accordance with a second embodiment of the invention.

Normally, it will be preferred that the force characteristics and angular displacements between the cam member and cam follower (and thus between the pulley and shaft) be the same in opposite rotational directions, although for some applications it may be desirable that they be asymmetrical and different in opposite rotational directions. The cam member may be formed to afford desired characteristics in opposite rotational directions by appropriately shaping the contours of the arcuate surfaces of the cam member between the low points or valleys 84 and the cam lobes 82. For equal characteristics in opposite rotational directions, the surface contours should be symmetrical and the same on opposite sides of the cam lobes and on opposite sides of a valley between cam lobes. For different characteristics in opposite directions, the contours may be asymmetrical and have different contours on opposite sides of the cam lobes 82 and on opposite sides of the valleys 84 between lobes, as shown in FIG. 5D.

As previously noted, the annular cam member 36 is slideably disposed for axial movement on hub 30 of the drive system. The diameter of the opening in the cam member is slightly greater than the outer diameter of the hub 30 to enable the cam member to slide and rotate freely on the hub. The cam member is coupled to the pulley so that rotation of the pulley causes rotation of the cam member. This coupling may be loose, although it is preferably tight. As best shown in FIGS. 2 and 5A-C, in the preferred embodiment, the outer peripheral circumference of the cam member may be formed with a plurality of axially extending splines 88, and the inner circumferential surface of pulley 22 may be formed with a plurality of corresponding splines 90 that engage and cooperate with splines 88 so that the cam member can move axially relative to the pulley while remaining tightly engaged with the pulley for rotation therewith. The axial length of the splines 90 on the interior circumference of the pulley is preferably selected to enable the cam member to slide axially relative to the pulley less than a distance corresponding to the axial distance between the peak of the cam lobes 82 and the valleys 84 between cam lobes, with the corresponding splines 88 of the cam member remaining engaged with splines 90 so that the rotation of the pulley is positively transmitted to the cam member and they rotate in unison. This enables the rotational force imparted to pulley 22 by the belt to be positively transmitted to the alternator shaft 24, as will be explained.

FIGS. 6A-C illustrate a preferred embodiment of a cam follower 34 formed to cooperate with cam member 36. As shown in the figures, the cam follower comprises a flange-shaped (in cross-section) tubular member having a rear cylindrical tubular section 102 and a forward annular section 104 with a greater outer diameter and smaller axial length than the rear tubular section 102, as shown. The cam follower, which cooperates with the cam member, as will be explained, may be formed of bronze and secured to the hub 30 as by press fitting, brazing or welding. The outer diameter of the rear section 102 may be sized to receive the bushing 40 for journaling the cam follower 34, hub 30 and shaft 24 for rotation within the pulley cavity, as shown in FIG. 3. Bearing 42 journals the forward end of the hub within the pulley.

Figure 7:
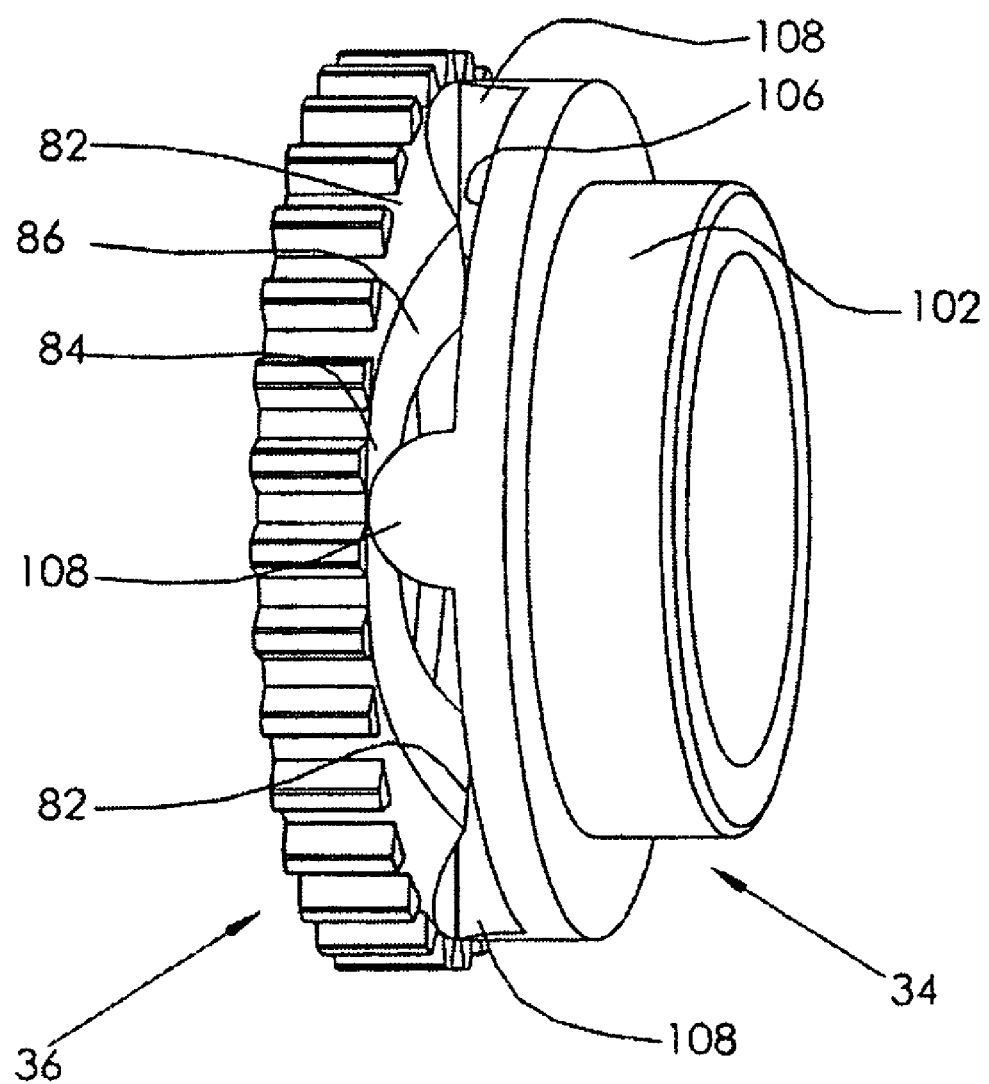
FIG. 7 is a perspective view illustrating the cooperation between the cam member and cam follower of FIGS. 5 A-C and FIGS. 6A-C, respectively.

The radially extending forward planar surface 106 of annular section 104 of the cam follower 34 may have a plurality of cam follower elements or protrusions 108 formed thereon for cooperation with corresponding cam lobes 82 of the cam member 36, as shown in FIG. 7. As shown in FIG. 6A, the cam follower elements 108 may comprise semi-cylindrical protrusions extending radially across the planar surface 106 and spaced symmetrically at equal angles about the circumference of surface 106. These semi-cylindrical protrusions provide smoothly rounded surfaces that slide easily on the smoothly contoured surfaces 84, 86 and cam lobes 82 of the cam member.

As will be appreciated, the cam follower 34 will preferably be designed to match the cam member 36 so that it has the same number of follower elements as there are cam lobes, and so that the follower elements are angularly disposed about the circumference of the planar surface of section 104 of the cam follower to correspond to the angular disposition of cam lobes on the cam member. If an asymmetrical cam member as described above is employed, the cam follower may also be correspondingly asymmetrical.

FIG. 3 illustrates the drive system of the invention assembled on the alternator shaft 24 within the pulley 22. As shown, hub 30 is threaded onto the end of the shaft and shaft lock 56, which may be used to further secure hub 30 to alternator shaft 24, is disposed on the squared end 54 of the shaft with teeth 58 of the shaft lock mating with corresponding splines 60 formed on the inner circumference at the forward end of the hub. The hub 30 with the cam follower 34 secured thereto is journaled within the pulley by bushing 40, as previously described. The forward end of the hub is journaled within the pulley by bearing 42. Cam 36 is slideably and rotationally disposed on hub 30 with splines 88 engaging splines 90 of the pulley. The cam is urged into engagement with the cam follower by the annular springs 70.

In operation, the cam and cam follower always remain positively engaged. Unlike designs with one-way clutches, the drive system of the invention does not have an overrunning condition where the pulley and shaft free run. Rather, in the invention, there is always positive engagement between the pulley and the shaft through the cam member and cam follower. When the pulley and alternator shaft are turning in unison, the cam follower elements 108 are located at some intermediate position on the contoured surface of the cam member. FIG. 7 shows the cam follower elements engaging the contoured surfaces 86 of the cam member at valleys 84. Changes in the relative angular rotation in either direction between the cam member and the cam follower cause the follower elements to slide on the contoured ramps of the cam member. As will be described, this increases the axial force of engagement between the cam member and the cam follower, and, consequently, their frictional engagement.

When the rotational velocity of the pulley suddenly changes, as when the pulley experiences a sudden acceleration during combustion, the drive system of the invention permits instantaneous angular deviation or slippage between the pulley and the shaft while maintaining the pulley and shaft in positive engagement. As the pulley accelerates, the cam member which is connected to the pulley by splines 88 and 90 also accelerates and rotates relative to the cam follower. The inertia and torsional load of the alternator shaft and armature tend to maintain their rotational speed. As the cam member rotates relative to the cam follower, the cam follower elements slide along the contoured ramps causing the cam member to slide axially along the hub, compressing springs 70 between the forward surface 80 of the cam member and bearing 42. The axial force exerted by springs 70 is selected to maintain the cam member and cam follower in contact as the cam member slides axially, so that the cam follower elements 108 slide up the contoured ramp surfaces 86 of the cam member toward the cam lobes 82. As the springs 70 are compressed by the axial movement of the cam member, the axial force they exert on the cam member increases and, accordingly, the force of the contact and the friction between the cam member and the cam follower also increases. This axial force increase is gradual, and varies as a function of the spring rate, the shape of the contoured ramps, and the positions of the cam follower elements on the ramps. The axial force increases in magnitude as the springs are compressed and the follower elements 108 move up the contoured ramps 86 toward the cam lobes 82. This increases the frictional engagement between the cam member and the cam follower, which exerts an increasing rotational force on the cam follower that urges the alternator shaft to accelerate to match the rotational speed at the pulley. The spring rate of the springs 70 is selected so that the compressive force they exert on the cam member, and through the cam member on the cam follower, is sufficient to cushion abrupt increases of pulley speed and abrupt decreases of pulley speed relative to the alternator shaft speed.

As the rotational speed of the alternator shaft increases and the speed differential between the pulley and the shaft decreases, the amount of force required to rotate the alternator shaft decreases, allowing the compressive force of springs 70 to move the cam axially rearwardly toward the cam follower. This permits the cam follower elements to slide back down the contoured ramps of the cam member. The axial movement of the cam continues until the compressive axial force exerted by springs matches the torsional force required to rotate the alternator shaft at the same speed as the pulley. When the axial force of the springs and the torsional force of the alternator shaft are in equilibrium, cam follower elements 108 will typically be positioned at an intermediate location on the contoured ramps of the cam member, where they will typically remain until the pulley experiences another rotational perturbation.

When the rotational speed of the pulley suddenly decelerates, as during compression, the cam member and the cam follower allow relative rotation between the pulley and the shaft in the opposite direction. The inertia of the alternator shaft and armature tends to maintain the rotational speed of the alternator shaft as the pulley abruptly slows. The relative rotation between the cam member and the cam follower moves the cam axially in the forward direction, compressing the springs 70 against the bearing 42 in a similar manner to that described above for acceleration of the pulley. As the springs compress, the axial force on the cam member and its frictional engagement with the cam follower increase, causing the rotational speed of the alternator shaft to decrease. As the differential rotational velocity between the pulley and the shaft decreases, the torsional force presented by the shaft is reduced. This allows the cam member to move axially in a rearward direction toward the cam follower and to rotate angularly relative to the cam follower until the compressive force of the springs produces a torsional force required to rotate the armature shaft at the same speed as the pulley, producing equilibrium. At equilibrium, the cam member and the cam follower assume rotational positions with the follower elements located at an intermediate position on the contoured ramps of the cam member.

As may be appreciated from the foregoing, the drive system of the invention provides a simple and elegant solution to the problem of compensating for both sudden acceleration as well as sudden deceleration of a pulley connected to the shaft of a rotating device. Not only does the invention operate equally bidirectionally to compensate for and dampen abrupt accelerations and decelerations, it operates substantially instantaneously and maintains positive contact between the pulley and the shaft, permitting greater control over the compensation. Accordingly, the invention is very effective in substantially reducing or eliminating vibration and noise in rotating devices, such as automotive alternators, caused by the pulsating characteristics of a prime mover driver such as an internal combustion engine.

It will also be appreciated from the foregoing that cam lobes and follower elements shaped differently from those described may be effectively employed. Moreover, the arrangement of the cam member and cam follower may be reversed, so that the cam member is fixed to the hub while the cam follower is slideably and rotatably disposed for axially and rotational movement on the hub.

FIGS. 8A-B illustrate a second embodiment of a drive system in accordance with the invention for dampening accelerations and decelerations of a pulley driving the shaft of a rotary device. Unlike the first embodiment of the FIGS. 1-7 that affords positive mechanical engagement between a drive pulley and a shaft, the second embodiment of the invention affords a springy connection between a pulley and a shaft.

As shown, the second embodiment may comprise a drive pulley 120 having a large cylindrical cavity in its interior and with a plurality of inwardly extending radial projections 122. As shown in FIGS. 8A-B, three projections 122 may be disposed symmetrically on and equally spaced about the inner cylindrical surface of the pulley cavity, to extend radially inwardly toward the center line of the pulley. The projections 122 may be somewhat T-shaped to provide at their inner ends a circumferentially extending flange 124 (as seen from the end of the pulley) that extends axially the length of the pulley adjacent to a hub of the pulley, and are connected to the inner cylindrical surface of the pulley cavity by a curved base 126 that widens at the inner circumferential surface of the pulley and provides an axially extending notch 128 between the base and the flange to receive the end of a flat leaf spring 130 that extends between adjacent projections 122.

A cooperating hub 140, adapted to be connected to the shaft of a rotary device, has a plurality of symmetrically disposed radially outwardly extending semi-cylindrical projections 142 that extend along the axial length of the hub. The projections provide smoothly rounded outer ends 144 that engage corresponding leaf springs 130 to deform them toward the inner surface of the pulley cavity, as shown in the figures. In the positions shown in FIG. 8A, the ends 144 of the projections engage the leaf springs 130 at approximately mid length. As the pulley rotates relative to the shaft and hub 140, the ends 144 of the projections deform the leaf springs asymmetrically. As the springs deform, they exert a restoring force opposite to the direction of deformation, i.e., counter to the direction of rotation of the pulley, which tends to bring the pulley and hub back into the equilibrium position as shown in FIG. 8A. This dampens the effect of the abrupt rotational deviation between the pulley and the hub. Thus, the second embodiment provides a bidirectional springy connection between the hub and the pulley that compensates for accelerations and decelerations of the pulley.

FIGS. 9A-B illustrate a third embodiment of the invention. The second and third embodiments share some similarities. As shown in the FIGS. 9A-B, the second embodiment comprises a pulley 150 having a plurality of inward radial projections 152 and having a generally trapezoidal shape and disposed symmetrically at equal angles around the inner circumference of the pulley cavity. A hub 154 adapted to be connected to the shaft of a rotary device (not shown) may have a corresponding plurality of outwardly extending radial projections 156 that have a generally inverted trapezoidal shape, as shown. Projections 156 are also disposed symmetrically and equally about the circumference of the hub. A coil spring 158 may be disposed between each pair of projections 152, 156. The coil springs 158, which are preferably of equal length and spring constant, are the only connections between the shaft hub and the pulley, and establish a neutral position where the shaft projections 156 will be approximately in the center of the arc distance between pairs of pulley projections 152. The springs provide a springy connection between the hub and the pulley to dampen relative rotational deviations and compensate for acceleration and deceleration of the pulley relative to the shaft. As the hub rotates relative to a pulley in one direction, it compresses the coil springs 158 in the decreasing spaces between projections, which exert counter restoring forces in the opposite direction to return the relative rotational positions of the hub and the pulley to the neutral position. As with the second embodiment, the more that the distance between projections on the hub and the pulley decreases, the greater the restoring force exerted by the springs. If springs of different lengths and spring rate are used, the neutral position of the shaft projections may be displaced from the center of the arc distance between pairs of pulley projections. This will provide an asymmetrical compensating characteristic for accelerations and decelerations in different rotational directions.

FIGS. 10A-B illustrate a fourth embodiment of a drive system in accordance with the invention. The embodiment of FIGS. 10A-B may be somewhat similar to the third embodiment of FIGS. 9A-B, comprising a pulley 160 and a shaft hub 162 having projections 164 and 166, respectively, shaped similarly to the projections of the embodiment of the FIGS. 9A-B. In the fourth embodiment, there is no spring connection between the shaft projections 164 and the hub projections 166. Instead, the clearances between the inns of the projections and the adjacent surfaces of the other member may be made quite small, and the cavities between projections may be filled with a viscous fluid, such as hydraulic oil or grease. When a torque is applied to the pulley causing it to rotate relative to the shaft, the cavities between pulley projections and the hub projections will decrease in size in the direction of pulley rotation. Simultaneously, the cavities on the other sides of the projections will increase in size. The fluid in the cavities decreasing in size will tend to be compressed and will flow past the small clearances into the cavity that is increasing in size. The small clearances will present a substantial restriction to fluid flow, so that the structure will act similar to a shock absorber to dampen and cushion sudden differential rotational velocity changes. End caps and appropriate fluid seals (not shown) confine the fluid within the cavities of the structure.

In yet another embodiment, the embodiments of FIGS. 9A-B and FIGS. 10A-B may be combined to afford a drive system that combines both spring damping and fluid damping.

From the foregoing, it can be seen that drive systems in accordance with the invention provide bidirectional damping and compensation for sudden relative rotational changes between a pulley and the shaft of a rotating device driven by the pulley caused by sudden acceleration or deceleration of the pulley driving system, thereby avoiding the wear and tear caused by the impact of a sudden engagement between the pulley and shaft, as well as vibration and noise. Advantageously, the invention accomplishes this while maintaining continuous positive engagement between the pulley and the shaft and transmitting bidirectional speed changes of the pulley gradually and in a controlled manner to the shaft. Although the invention has been described in the context of, and is particularly applicable to, an automotive application where rotating devices are driven by a serpentine belt and an internal combustion engine, it will be appreciated that the invention has other applications. Indeed, the invention may be used effectively to dampen sudden rotational velocity changes in many different types of systems driven by many different types of prime movers.

While the foregoing has been with reference to particular described embodiments of the invention, it will be appreciated by those skilled in the art that changes to these embodiments may be made without departing from the principles of the invention, the scope of which is defined by the appended claims.

The invention claimed is:

1. A drive system for a rotary device having a shaft, comprising:
    a pulley adapted to be rotated by a prime mover;
    a hub connected to the shaft and journaled for rotation within the pulley;
    a movable member slideably disposed for axial movement on the hub and within the pulley, the movable member being rotationally fixed to the pulley for rotation therewith;
    a cooperating member on the hub engaging the movable member to transmit rotation of the pulley to the shaft, the cooperating member and the movable member being slideable relative to each other to afford relative bidirectional rotation between the members over a predetermined range of angular rotations;
    wherein a first one of said members comprises a cam and a second one of said members comprises a cam follower, the cam and the cam follower respectively having cooperating cam lobes and cam follower elements that produce axial movement of the movable member upon said relative angular rotation of said members, the cam lobes and follower elements being symmetrically disposed at equal angles around a circumference of the cam and the cam follower, said angles establishing said predetermined range of angular rotations, and wherein the cam lobes comprise raised peaks connected by contoured ramps on a first surface of the cam, and the follower elements comprise rounded projections on a second surface of the cam follower that slide on said contoured ramps upon relative rotation of the cam and the cam follower, and wherein the movable member has first splines located on its periphery, and the pulley has cooperating second splines on an interior of the pulley that cooperate with the first splines to couple the movable member to the pulley for axial movement relative thereto; and
    a resilient mechanism urging the movable member into continuous engagement with the cooperating member; wherein bidirectional rotational velocity changes of the pulley cause corresponding relative angular rotation of the movable and cooperating members to reduce the impact of said velocity changes on the shaft.

2. The drive system of claim 1, wherein the movable and cooperating members are formed such that said relative rotation is transformed into axial movement of the movable member.

3. The drive system of claim 1, wherein said contoured ramps are contoured asymmetrically about a valley in the first surface between adjacent cam lobe peaks.

4. The drive system of claim 1, wherein said first and second splines extend axially on said movable member and said pulley, respectively, and are sized to permit the movable member to move axially on said hub a predetermined distance corresponding to the axial distance between the peaks and valleys of the cam, while retaining the movable member coupled to the pulley.

5. The drive system of claim 4, wherein said axial movement of the movable member rotates the movable member relative to the cooperating member and produces relative angular rotation of the pulley and the shaft.

6. The drive system of claim 1, wherein the resilient mechanism comprises a spring that exerts an axial force on the cam and the cam follower that increases as the relative angular rotation between the cam and the cam follower increases.

7. The drive system of claim 6, wherein the spring is selected to exert a force sufficient to overcome a torque load presented by the shaft for an axial movement of the movable member that is less than the axial distance between the peaks and valleys of the cam.

8. The drive system of claim 1, wherein said rotary device comprises an automotive alternator, and said prime mover comprises an internal combustion engine.

9. A drive system for a rotary device having a shaft, comprising:
- a pulley adapted to be rotated by a prime mover;
- a hub connected to the shaft and journaled for rotation within the pulley;
- a movable member slideably disposed for axial movement on the hub and within the pulley, the movable member being rotationally fixed to the pulley for rotation therewith;
- a cooperating member on the hub engaging the movable member to transmit rotation of the pulley to the shaft, the cooperating member and the movable member being slideable relative to each other to afford relative bidirectional rotation between the members over a predetermined range of angular rotations;
- wherein a first one of said members comprises a cam and a second one of said members comprises a cam follower, the cam and the cam follower respectively having cooperating cam lobes and cam follower elements that produce axial movement of the movable member upon said relative angular rotation of said members, the cam lobes and follower elements being symmetrically disposed at equal angles around a circumference of the cam and the cam follower, said angles establishing said predetermined range of angular rotations, and wherein the cam lobes comprise raised peaks connected by contoured ramps on a first surface of the cam, and the follower elements comprise rounded projections on a second surface of the cam follower that slide on said contoured ramps upon relative rotation of the cam and the cam follower, said contoured ramps being contoured symmetrically about a valley in the first surface between adjacent cam lobe peaks; and
- a resilient mechanism urging the movable member into continuous engagement with the cooperating member; wherein bidirectional rotational velocity changes of the pulley cause corresponding relative angular rotation of the movable and cooperating members to reduce the impact of said velocity changes on the shaft.

* * * * *